US005691165A

United States Patent [19]
Nielsen et al.

[11] Patent Number: 5,691,165
[45] Date of Patent: Nov. 25, 1997

[54] METHOD FOR PRODUCTION OF A WHEY PROTEIN HYDROLYZATE

[75] Inventors: Per Munk Nielsen, Hillerød; Svend Eriksen, Allerød; Ole Regnar Hansen, Herlev, all of Denmark

[73] Assignee: Novo Nordisk A/S, Bagsvaerd, Denmark

[21] Appl. No.: 157,074

[22] PCT Filed: May 27, 1992

[86] PCT No.: PCT/DK92/00170

§ 371 Date: Nov. 30, 1993

§ 102(e) Date: Nov. 30, 1993

[87] PCT Pub. No.: WO92/21248

PCT Pub. Date: Dec. 10, 1992

[30] Foreign Application Priority Data

May 31, 1991 [EP] European Pat. Off. ............ 91610049

[51] Int. Cl.$^6$ ............................ C12P 21/06; C12P 21/04; C12N 9/56; A23C 21/02
[52] U.S. Cl. ............................ 435/68.1; 426/41; 435/71.2; 435/222
[58] Field of Search ............................ 435/68.1, 71.2, 435/222; 426/34, 41

[56] References Cited

U.S. PATENT DOCUMENTS

| | | | |
|---|---|---|---|
| 4,427,658 | 1/1984 | Maubois et al. | 424/177 |
| 4,636,388 | 1/1987 | Lin et al. | 426/7 |

FOREIGN PATENT DOCUMENTS

| | | |
|---|---|---|
| 0 065 663 | 12/1982 | European Pat. Off. |
| 0 226 221 | 6/1987 | European Pat. Off. |
| 0 274 946 | 7/1988 | European Pat. Off. |
| 0 322 589 | 7/1989 | European Pat. Off. |
| WO 91/10369 | 7/1991 | WIPO |

*Primary Examiner*—David M. Naff
*Attorney, Agent, or Firm*—Steve T. Zelson, Esq.; Valeta Gregg, Esq.

[57] ABSTRACT

A well tasting and organoleptically acceptable whey protein hydrolyzate is produced in high yield by a method using a combination of non-pH-stat hydrolysis and ultrafiltration. Preferably, the method is carried out by mixing a material containing at least 65% whey protein as dry matter and water to form a slurry containing a whey protein content of about 7–20%, heating the slurry to above 600° C., adjusting the pH of the slurry to about 8, hydrolyzing the slurry with at least two different proteases to a degree of hydrolysis of between 17 and 35% without adjusting the pH during hydrolysis to produce a hydrolyzed slurry, inactivating the proteases and separating the hydrolyzed slurry with an ultrafiltration unit having a cut-off value above 10,000 to form a permeate containing the whey protein hydrolyzate. One protease may be obtained from *B. Licheniformis* and the other from *B. Subtilis*. The hydrolyzed slurry or the permeate may be treated with activated carbon, and the permeate may be concentrated by nanofiltration and/or by evaporation.

13 Claims, No Drawings

METHOD FOR PRODUCTION OF A WHEY PROTEIN HYDROLYZATE

CROSS-REFERENCE TO RELATED APPLICATIONS

This application is a 371 of PCT/DK92/00170 filed May 27, 1992, which is incorporated herein by reference.

The invention comprises a method for production of a whey protein hydrolyzate.

Many methods for production of a protein hydrolyzate with good organoleptic properties can be carried out with a low yield only. Thus, it is the purpose of the invention to indicate a method for production of a protein hydrolyzate with good organoleptic properties, which can be carried out with a relatively high yield.

Surprisingly, according to the invention it has been found that a certain combination of a non-pH-stat hydrolysis and an ultrafiltration/microfiltration provides a process for production of a well tasting and organoleptically acceptable product in high yield.

Thus, the method according to the invention for production of a whey protein hydrolyzate is characterized by the fact 1) that a whey protein product with at least 65% protein calculated as dry matter and water is mixed to a slurry with a protein content up to about 20%, preferably up to 12%, 2) that a heat treatment to a temperature above 60° C. is carried out, 3) that the mixture from step 2) is proteolytically hydrolyzed by means of a protease producible by means of *B. licheniformis*, preferably Alcalase®, and/or a protease producible by means of *B. subtilis*, preferably Neutrase®, by means of a non-pH-stat method to a DH of between 15 and 35%, 4) that the mixture from step 3) is separated on an ultrafiltration/microfiltration unit with cut-off value above 10,000, the permeate constituting the protein hydrolyzate, and 5) that the hydrolysis is terminated by inactivation of the enzyme(s).

It is to be understood that all kinds of whey protein products can be used in step 1, e.g. the usual whey protein produced in relation to cheese manufacture.

In regard to the proteolytic enzyme(s) it is especially preferred to use Alcalase® (with a high pH optimum) first, and then Neutrase® (with a lower pH optimum). This is especially well suited to the non-pH-stat-method used according to the invention.

It is to be understood that the enzyme inactivation (step 5)) can be carried out before the ultrafiltration/microfiltration (step 4)). Also, it is to be understood that step 5 can be omitted altogether, if the cut-off value of the membrane is low enough to retain all enzymes in the concentrate.

A whey protein hydrolyzate with a composition similar to the whey protein hydrolyzate produced by means of the method according to the invention is described in U.S. Pat. No. 4,427,658.

Also, EP 226221 describes a whey protein hydrolyzate, which however, in contradistinction to the whey protein hydrolyzate produced by means of the method according to the invention is free from lactose and is produced by means of the pH-stat techniques.

Also, U.S. Pat. No. 4,293,571, EP 321603 and EP 322589 describe a whey protein hydrolyzate, which is produced by hydrolysis with subsequent heat treatment, in contradistinction to the whey protein hydrolyzate produced by means of the method according to the invention, i.e. by means of heat treatment with subsequent hydrolysis. The high values of the degree of hydrolysis which can be obtained according to the invention, cannot be obtained with the prior art methods.

EP 65663 describes a whey protein hydrolyzate, which is produced without heat treatment before the hydrolysis, in contradistinction to the method according to the invention.

In Research Disclosure, August 1981 no. 20826 a method similar to the method according to the invention is described. However, the prior art method is restricted to blood as the starting material, and also, the prior art method is performed by means of the pH-stat method.

To the best of the applicant's knowledge, all prior art methods for production of a whey protein hydrolyzate give rise to a whey protein hydrolyzate with an unacceptable taste. The whey protein hydrolyzate according to the invention has a marked agreeable taste. Also, in relation to many of the prior art methods for production of whey protein hydrolyzate the end product is obtained in a low yield and/or at high production cost.

Many of the prior art methods for production of whey protein hydrolyzate give rise to a whey protein hydrolyzate which is not heat stable and not fully soluble in a broad pH interval. The whey protein hydrolyzate produced by means of the method according to the invention is heat stable and fully soluble in a broad pH interval.

A preferred embodiment of the method according to the invention comprises that the slurry in step 1) has a protein content of 7–12%. In this manner the equipment is utilized optimally, and also, the viscosity is not too high for handling.

A preferred embodiment of the method according to the invention comprises that the heat treatment in step 2) is carried out between 70° and 90° C. This temperature interval is especially well suited in relation to performance of the usually used heat exchangers.

A preferred embodiment of the method according to the invention comprises that the pH adjustment in step 3) is carried out by means of $Ca(OH)_2$ and/or KOH. In this manner a better taste is obtained, and also, a favorable mineral distribution in the final product is obtained. Also, sodium carbonate or sodium phosphate can be used for pH adjustment in order to precipitate the $Ca^{++}$ in the raw whey protein product.

A preferred embodiment of the method according to the invention comprises that the hydrolysis in step 3) is carried out to a DH of between 20–30. In this manner a product with excellent organoleptic properties is obtained.

A preferred embodiment of the method according to the invention comprises that the cut-off value of the ultrafiltration/microfiltration unit is above 50.000. In this manner a very high flux is obtainable.

A preferred embodiment of the method according to the invention comprises that the inactivation of the enzyme(s) (step 5)) is carried out by heat treatment. This inactivation is especially well suited in case the pH of the final protein hydrolyzate is supposed to be relatively high (around neutrality).

A preferred embodiment of the method according to the invention comprises that the inactivation of the enzyme(s) (step 5)) is carried out by acid treatment. This inactivation is especially well suited in case the pH of the final protein hydrolyzate is supposed to be relatively low (acidic).

A preferred embodiment of the method according to the invention comprises that the mixture at the end of step 4) is treated with activated carbon for more than 5 minutes at a temperature, which is preferably between 50° and 70° C. in an amount corresponding to between 1 and 5% carbon, calculated in relation to dry matter content, and that the activated carbon is removed. In this manner the flavor is improved.

A preferred embodiment of the method according to the invention comprises that after step 5) a concentration is carried out by nanofiltration/hyperfiltration/reverse osmosis at a temperature, which is preferably between 50° and 70° C. and/or evaporation, whereafter the retentate is collected as the protein hydrolyzate solution. By means of the nanofiltration a desalination can be carried out by proper selection of the membrane; besides nanofiltration/hyperfiltration/ reverse osmosis is an inexpensive way for removal of water. Evaporation has the advantage of obtaining a high dry matter content in the concentrate before drying.

A preferred embodiment of the method according to the invention comprises that the protein hydrolyzate solution from step 5) is spray-dried to a water content below 6.5%. In this manner a stable product is obtained, both microbially and organoleptically.

The method according to the invention will be illustrated in the following examples.

For the sake of a better overview a survey of some of the parameters which are changed in the examples appear from the table shown below.

| Example no. | Inactivation H = heat A = acid | UF modul | pH pH N = neutral A = acid | pH adjustment Ca = Ca(OH)$_2$ Na = NaOH | Carbon treatment |
|---|---|---|---|---|---|
| 1 | H | PCI | N | Ca | + |
| 2 | H | PCI | N | Na | + |
| 3 | A | PCI | A | Ca | + |
| 4 | H | DDS | N | Ca | + |
| 5 | H | PCI | N | Ca | + |
| 6 | H | PCI | N | Ca | + |
| 7 | H | PCI | N | Ca | + |
| 8 | A | DDS | A | Na | + |

EXAMPLE 1

Feed

The starting material is spray-dried whey protein concentrate with approx. 80% protein calculated as dry matter.

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with Ca(OH)$_2$. About 1% of Ca(OH)$_2$ based on amount of protein is needed.

Hydrolysis

Temperature 53°–54° C.

Enzyme 1: Alcalase® 2.4 L. Dosage E/S=2.2% (E/S is the ratio between of the weight of the enzyme and the weight of the protein part of the substrate (protein dry matter)).

Enzyme 2: Neutrase® 0.5 L. Dosage E/S=1.1%. Neutrase is added when the pH has decreased to <7.0.

Process time 12 hours. The enzymatic hydrolysis is monitored by the osmolality. The increase in osmolality should be 175 mOsm/kg (measured with a concentration of 8% of protein in the slurry).

Ultrafiltration Separation

The UF-plant used comprises PCI modules mounted with FP100 membranes with cut-off value 100,000.

Concentration to half of the initial volume and subsequent diafiltration with twice the volume of the concentrate. Final concentration to maximum dry matter content.

Temperature 60°–65° C.

The retentate which is the main by-product of the process is discharged.

Inactivation

The permeate is heat treated for 3 minutes at 85° C. in order to inactivate the enzymes and for bacteriological reasons.

Nanofiltration

Concentration to 25°–30° Brix

Temperature 55°–60° C.

The nanofiltration permeate appearing as a by-product is discharged

Treatment With Activated Carbon

4% activated carbon (Picatif FGV 120) based on amount of dry matter measured as °Brix is added to the nanofiltration retentate at 55°–60° C. Reaction time 30 minutes.

Filtration

Removal of activated carbon on plate filter

Final Products

The whey protein hydrolyzate concentrate with a dry matter content of 25% is further processed by sterile filtration and spray-drying, the spray-drying being performed by drying the whey protein hydrolyzate concentrate at $T_i$=200° C. and $T_o$=75° C. in a spray-dryer with atomization wheel.

Characterization of the Whey Protein Hydrolyzate Concentrate Obtained

| Taste: | No off-flavor and a low degree of bitterness | |
|---|---|---|
| Composition: | Dry matter | 95% |
| | Protein in dry matter (N*6.38) | 89.5% |
| | Ash in dry matter | 4.4% |
| | Fat in dry matter | <0.1% |
| Properties: | Solubility | Fully soluble |
| | pH in solution with 5% protein | 5.9 |
| | Osmolality in solution with 5% protein | <200 mOsm/kg |

| | -continued | |
|---|---|---|
| Molecular distribu- tion: | Degree of hydrolysis | 24.8% |
| | Mw | 1030 |
| | Mn | 500 |
| | Average peptide chain length | 4.0 |

EXAMPLE 2

Feed

The starting material is spray-dried whey protein concentrate with approx. 80% protein calculated as dry matter.

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with 4N NaOH.

Hydrolysis

Temperature 53°–54° C.
Enzyme 1: Alcalase® 2.4 L. Dosage E/S=2.2%
Enzyme 2: Neutrase® 0.5 L. Dosage E/S=1.1 %. Neutrase is added when the pH has decreased to <7.0.

Process time 12 hours. The enzymatic hydrolysis is monitored by the osmolality. The increase in osmolality should be 175 mOsm/kg (measured with a concentration of 8% of protein in the slurry).

Ultrafiltration Separation

The UF-plant used comprises PCI modules mounted with FP100 membranes with cut-off value 100,000.

Concentration to half of the initial volume and subsequent diafiltration with twice the volume of the concentrate. Final concentration to maximum dry matter content.

Temperature 60°–65° C.

The retentate which is the main by-product of the process is discharged.

Inactivation

The permeate is heat treated for 3 minutes at 85° C. in order to inactivate the enzymes and for bacteriological reasons.

Nanofiltration

Concentration to 25°–30° Brix
Temperature 55°–60° C.

The nanofiltration permeate appearing as a by-product is discharged

Treatment With Activated Carbon

4% activated carbon (Picatif FGV 120) based on amount of dry matter measured as °Brix is added to the nanofiltration retentate at 55°–60° C. Reaction time 30 minutes.

Filtration

Removal of activated carbon on plate filter

Final Products

The whey protein hydrolyzate concentrate with a dry matter content of 25% is further processed by sterile filtration and spray-drying, the spray-drying being performed by drying the whey protein hydrolyzate concentrate at $T_i=200°$ C. and $T_o=75°$ C. in a spray-dryer with atomization wheel.

Characterization of the Whey Protein Hydrolyzate Concentrate Obtained

| Taste: | No off-flavor and a low degree of bitterness | |
|---|---|---|
| Compos- ition: | Dry matter | 94.5% |
| | Protein in dry matter (N*6.38) | 84% |
| | Ash in dry matter | 4% |
| | Fat in dry matter | <0.1% |
| Properties: | Solubility | Fully soluble |
| | pH in solution with 5% protein | 6.5 |
| | Osmolality in solution with 5% protein | <200 mOsm/kg |
| Molecular distribu- tion: | Degree of hydrolysis | 27% |
| | Mw | 800 |
| | Mn | 400 |
| | Average peptide chain length | 3.5 |

EXAMPLE 3

Feed

The starting material is spray-dried whey protein concentrate with approx. 80% protein calculated as dry matter.

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with $Ca(OH)_2$. About 1% of $Ca(OH)_2$ based on amount of protein is needed.

Hydrolysis

Temperature 53°–54° C.
Enzyme 1: Alcalase® 2.4 L. Dosage E/S=2.2%
Enzyme 2: Neutrase® 0.5 L. Dosage E/S=1.1%. Neutrase is added when the pH has decreased to <7.0.

Process time 12 hours. The enzymatic hydrolysis is monitored by the osmolality. The increase in osmolality should be 175 mOsm/kg (measured with a concentration of 8% of protein in the slurry).

pH-adjustment pH is adjusted to 4.2 by means of 30% HCl in order to obtain an end product suitable for fortifying acidic beverages with protein.

Ultrafiltration Separation

The UF-plant used comprises PCI modules mounted with FP100 membranes with cut-off value 100,000.

Concentration to half of the initial volume and subsequent diafiltration with twice the volume of the concentrate. Final concentration to maximum dry matter content.

Temperature 60°–65° C.

The retentate which is the main by-product of the process is discharged.

Pasteurization

The permeate is heat treated for 30 seconds at 75° C. for bacteriological reasons.

Nanofiltration

Concentration to 25°–30° Brix

Temperature 55°–60° C.

The nanofiltration permeate appearing as a by-product is discharged.

Treatment With Activated Carbon

4% activated carbon (Picatif FGV 120) based on amount of dry matter measured as °Brix is added to the nanofiltration retentate at 55°–60° C. Reaction time 30 minutes.

Filtration

Removal of activated carbon on plate filter

Final Products

The whey protein hydrolyzate concentrate with a dry matter content of 25% is further processed by sterile filtration and spray-drying, the spray-drying being performed by drying the whey protein hydrolyzate concentrate at $T_i=200°$ C. and $T_o=75°$ C. in a spray-dryer with atomization wheel.

Characterization of the Whey Protein Hydrolyzate Concentrate Obtained

| Taste: | No off-flavor and a low degree of bitterness | |
|---|---|---|
| Compos- | Dry matter | 94.5% |
| ition: | Protein in dry matter (N*6.38) | 84% |
| | Ash in dry matter | 4% |
| | Fat in dry matter | <0.1% |
| Properties: | Solubility | Fully soluble |
| | pH in solution with 5% protein | 6.5 |
| | Osmolality in solution with 5% protein | <200 mOsm/kg |
| Molecular | Degree of hydrolysis | 27% |
| distribu- | Mw | 800 |
| tion: | Mn | 400 |
| | Average peptide chain length | 3.5 |

EXAMPLE 4

Feed

The starting material is spray-dried whey protein concentrate with approx. 80% protein calculated as dry matter.

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with $Ca(OH)_2$. About 1% of $Ca(OH)_2$ based on amount of protein is needed.

Hydrolysis

Temperature 53°–54° C.

Enzyme 1: Alcalase® 2.4 L. Dosage E/S=2.2%

Enzyme 2: Neutrase® 0.5 L. Dosage E/S=1.1%. Neutrase is added when the pH has decreased to <7.0.

Process time 12 hours. The enzymatic hydrolysis is monitored by the osmolality. The increase in osmolality should be 175 mOsm/kg (measured with a concentration of 8% of protein in the slurry).

Ultrafiltration Separation

The UF-plant used comprises DDS modules mounted with GR40PP membranes with cut-off value 100,000.

Concentration to half of the initial volume and subsequent diafiltration with twice the volume of the concentrate. Final concentration to maximum dry matter content.

Temperature 60°–65° C.

The retentate which is the main by-product of the process is discharged.

Inactivation

The permeate is heat treated for 3 minutes at 85° C. in order to inactivate the enzymes and for bacteriological reasons.

Nanofiltration

Concentration to 25°–30° Brix

Temperature 55°–60° C.

The nanofiltration permeate appearing as a by-product is discharged

Treatment with Activated Carbon

4% activated carbon (Picatif FGV 120) based on amount of dry matter measured as ° Brix is added to the nanofiltration retentate at 55°–60° C. Reaction time 30 minutes.

Filtration

Removal of activated carbon on plate filter.

Final Products

The whey protein hydrolyzate concentrate with a dry matter content of 25% is further processed by sterile filtration and spray-drying, the spray-drying being performed by drying the whey protein hydrolyzate concentrate at $T_i=200°$ C. and $T_o=75°$ C. in a spray-dryer with atomization wheel.

Characterization of the Whey Protein Hydrolyzate Concentrate Obtained

| Taste: | No off-flavor and a low degree of bitterness | |
|---|---|---|
| Composition: | Dry matter | 94.5% |
| | Protein in dry matter (N*6.38) | 84% |
| | Ash in dry matter | 4% |
| | Fat in dry matter | <0.1% |
| Properties: | Solubility | Fully soluble |
| | pH in solution with 5% protein | 6.5 |
| | Osmolality in solution with 5% protein | <200 mOsm/kg |
| Molecular distribution: | Degree of hydrolysis | 27% |
| | Mw | 800 |
| | Mn | 400 |
| | Average peptide chain length | 3.5 |

EXAMPLE 5

Feed

The starting material is spray-dried whey protein concentrate with approx. 80% protein calculated as dry matter.

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with $Ca(OH)_2$. About 1% of $Ca(OH)_2$ based on amount of protein is needed.

Hydrolysis

Temperature 53°–54° C.
Enzyme 1: Alcalase® 2.4 L. Dosage E/S=2.2%
Enzyme 2: Neutrase® 0.5 L. Dosage E/S=1.1%. Neutrase is added when the pH has decreased to <7.0.
Process time 12 hours. The enzymatic hydrolysis is monitored by the osmolality. The increase in osmolality should be 175 mOsm/kg (measured with a concentration of 8% of protein in the slurry).

Ultrafiltration Separation

The UF-plant used comprises PCI modules mounted with FP100 membranes with cut-off value 100,000.

Concentration to half of the initial volume and subsequent diafiltration with twice the volume of the concentrate. Final concentration to maximum dry matter content.

Temperature 60°–65° C.

The retentate which is the main by-product of the process is discharged.

Inactivation

The permeate is heat treated for 3 minutes at 85° C. in order to inactivate the enzymes and for bacteriological reasons.

Nanofiltration

Concentration to 25°–30° Brix
Temperature 55°–60° C.

The nanofiltration permeate appearing as a by-product is discharged

Final Products

The whey protein hydrolyzate concentrate with a dry matter content of 25% is further processed by sterile filtration and spray-drying, the spray-drying being performed by drying the whey protein hydrolyzate concentrate at $T_i=200°$ C. and $T_o=75°$ C. in a spray-dryer with atomization wheel.

Characterization of the Whey Protein Hydrolyzate Concentrate Obtained

| Taste: | Slight off-flavor and a low degree of bitterness | |
|---|---|---|
| Composition: | Dry matter | 94.5% |
| | Protein in dry matter (N*6.38) | 84% |
| | Ash in dry matter | 4% |
| | Fat in dry matter | <0.1% |
| Properties: | Solubility | Fully soluble |
| | pH in solution with 5% protein | 6.5 |
| | Osmolality in solution with 5% protein | <200 mOsm/kg |
| Molecular distribution: | Degree of hydrolysis | 27% |
| | Mw | 800 |
| | Mn | 400 |
| | Average peptide chain length | 3.5 |

EXAMPLE 6

Feed

The starting material is spray-dried whey protein concentrate with approx. 80% protein calculated as dry matter.

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with $Ca(OH)_2$. About 1% of $Ca(OH)_2$ based on amount of protein is needed.

Hydrolysis

Temperature 53°–54° C.
Enzyme 1: Alcalase® 2.4 L. Dosage E/S=2.2%
Enzyme 2: Neutrase® 0.5 L. Dosage E/S=1.1%, Neutrase is added when the pH has decreased to <7.0.
Process time 12 hours. The enzymatic hydrolysis is monitored by the osmolality. The increase in osmolality should be 175 mOsm/kg (measured with a concentration of 8% of protein in the slurry).

Treatment With Activated Carbon

4% activated carbon (Picatif FGV 120) based on amount of dry matter measured as °Brix is added to the mixture at 55°–60° C. Ultrafiltration is carried out with activated carbon in the retentate.

Ultrafiltration Separation

The UF-plant used comprises PCI modules mounted with FP100 membranes with cut-off value 100,000.

Concentration to half of the initial volume and subsequent diafiltration with twice the volume of the concentrate. Final concentration to maximum dry matter content.

Temperature 60°–65° C.

The retentate containing the activated carbon is discharged.

Inactivation

The permeate is heat treated for 3 minutes at 85° C. in order to inactivate the enzymes and for bacteriological reasons.

Nanofiltration

Concentration to 25°–30° Brix

Temperature 55°–60° C.

The nanofiltration permeate appearing as a by-product is discharged

Final Products

The whey protein hydrolyzate concentrate with a dry matter content of 25% is further processed by sterile filtration and spray-drying, the spray-drying being performed by drying the whey protein hydrolyzate concentrate at $T_i=200°$ C. and $T_o=75°$ C. in a spray-dryer with atomization wheel.

Characterization of the Whey Protein Hydrolyzate Concentrate Obtained

| | | |
|---|---|---|
| Taste: | No off-flavor and a low degree of bitterness | |
| Compos- | Dry matter | 94.5% |
| ition: | Protein in dry matter (N*6.38) | 84% |
| | Ash in dry matter | 4% |
| | Fat in dry matter | <0.1% |
| Properties: | Solubility | Fully soluble |
| | pH in solution with 5% protein | 6.5 |
| | Osmolality in solution with 5% protein | <200 mOsm/kg |
| Molecular | Degree of hydrolysis | 27% |
| distribu- | Mw | 800 |
| tion: | Mn | 400 |
| | Average peptide chain length | 3.5 |

EXAMPLE 7

Feed

The starting material is liquid concentrated whey protein with approx. 80% protein calculated as dry matter, produced by ultrafiltration and diafiltration of whey until the wanted protein content, calculated as dry matter

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with $Ca(OH)_2$. About 1% of $Ca(OH)_2$ based on amount of protein is needed.

Hydrolysis

Temperature 53°–54° C.

Enzyme 1: Alcalase® 2.4 L. Dosage E/S=2.2%

Enzyme 2: Neutrase® 0.5 L. Dosage E/S=1.1%. Neutrase is added when the pH has decreased to <7.0.

Process time 12 hours. The enzymatic hydrolysis is monitored by the osmolality. The increase in osmolality should be 175 mOsm/kg (measured with a concentration of 8% of protein in the slurry).

Ultrafiltration Separation

The UF-plant used comprises PCI modules mounted with FP100 membranes with cut-off value 100,000.

Concentration to half of the initial volume and subsequent diafiltration with twice the volume of the concentrate. Final concentration to maximum dry matter content.

Temperature 60°–65° C.

The retentate which is the main by-product of the process is discharged.

Inactivation

The permeate is heat treated for 3 minutes at 85° C. in order to inactivate the enzymes and for bacteriological reasons.

Nanofiltration

Concentration to 25°–30° Brix

Temperature 55°–60° C.

The nanofiltration permeate appearing as a by-product is discharged.

Treatment With Activated Carbon

4% activated carbon (Picatif FGV 120) based on amount of dry matter measured as °Brix is added to the nanofiltration retentate at 55°–60° C. Reaction time 30 minutes.

Filtration

Removal of activated carbon on plate filter

Final Products

The whey protein hydrolyzate concentrate with a dry matter content of 25% is further processed by sterile filtration and spray-drying, the spray-drying being performed by drying the whey protein hydrolyzate concentrate at $T_i=200°$ C. and $T_o=75°$ C. in a spray-dryer with atomization wheel.

Characterization of the Whey Protein Hydrolyzate Concentrate Obtained

| | | |
|---|---|---|
| Taste: | No off-flavor and a low degree of bitterness | |
| Compos- | Dry matter | 94.5% |
| ition: | Protein in dry matter (N*6.38) | 84% |
| | Ash in dry matter | 4% |

-continued

|  |  |  |
|---|---|---|
|  | Fat in dry matter | <0.1% |
| Properties: | Solubility | Fully soluble |
|  | pH in solution with 5% protein | 6.5 |
|  | Osmolality in solution with 5% protein | <200 mOsm/kg |
| Molecular distribution: | Degree of hydrolysis | 27% |
|  | Mw | 800 |
|  | Mn | 400 |
|  | Average peptide chain length | 3.5 |

EXAMPLE 8

Feed

The starting material is spray-dried whey protein concentrate with approx. 80% protein calculated as dry matter.

Mixing

The raw material is diluted with deionized water to a protein content of 8%. The optimum temperature for fast solubilisation of the protein is 55°–60° C.

Heat Treatment

Pasteurisation is carried out in a heat exchanger for at least 2 minutes at 85° C. The purpose is to denature the protein in order to make the hydrolysis more efficient. Also in this manner a very low bacterial count before the incubation with the enzymes is obtained.

pH Adjustment pH is adjusted to 8.0 with 4N NaOH.

Hydrolysis

Temperature 55° C.
Enzyme 1: Alcalase® 2.4 L. Dosage E/S=2.0%
Enzyme 2: Trypsin PTN 3.3G. Dosage E/S=3.0%. Trypsin is added when the DH has reached 16% (after 3 hours and 30 minutes).
Total hydrolysis time: 5 hours and 15 minutes. The enzymatic hydrolysis is monitored by the osmolality.

pH-adjustment

The pH value is adjusted to 4.2 by means of 30% HCl in order to obtain an end product suitable for fortifying acidic beverages with protein.

Ultrafiltration Separation

The UF-plant used comprises DDS modules mounted with GR40PP membranes with cut-off value 100,000.

Concentration to half of the initial volume and subsequent diafiltration with twice the volume of the concentrate. Final concentration to maximum dry matter content.

Temperature 60°–65° C.

The retentate which is the main by-product of the process is discharged.

Pasteurization

The permeate is heat treated for 30 seconds at 75° C. in order to inactivate the enzymes and for bacteriological reasons.

Nanofiltration

Concentration to 25°–30° Brix
Temperature 55°–60° C.

The nanofiltration permeate appearing as a by-product is discharged.

Treatment With Activated Carbon

4% activated carbon (Picatif FGV 120) based on amount of dry matter measured as °Brix is added to the nanofiltration retentate at 55°–60° C. Reaction time 30 minutes.

Filtration

Removal of activated carbon on plate filter.

Final Products

The whey protein hydrolyzate concentrate with a dry matter content of 25% is further processed by sterile filtration and spray-drying, the spray-drying being performed by drying the whey protein hydrolyzate concentrate at $T_i=200°$ C. and $T_o=75°$ C. in a spray-dryer with atomization wheel.

Characterization of the Whey Protein Hydrolyzate Concentrate Obtained

|  |  |  |
|---|---|---|
| Taste: | No off-flavor and a low degree of bitterness |  |
| Composition: | Dry matter | 94.5% |
|  | Protein in dry matter (N*6.38) | 84% |
|  | Ash in dry matter | 4% |
|  | Fat in dry matter | <0.1% |
| Properties: | Solubility | Fully soluble |
|  | pH in solution with 5% protein | 4.2 |
|  | Osmolality in solution with 5% protein | <200 mOsm/kg |
| Molecular distribution: | Degree of hydrolysis | 21% |
|  | Mw | 800 |
|  | Mn | 595 |
|  | Average peptide chain length | 4.8 |

What is claimed is:

1. A method for production of a whey protein hydrolyzate, comprising
   (a) mixing a material containing at least 65% whey protein calculated as dry matter and water to form a slurry containing a whey protein content of about 7–20%;
   (b) heating the slurry to a temperature above 60° C.;
   (c) adjusting the pH of the slurry to about 8;
   (d) hydrolyzing the slurry by means of at least two different proteases, to a degree of hydrolysis of between 15 and 35% wherein the pH is not adjusted during the hydrolysis;
   (e) inactivating said proteases; and
   (f) separating the hydrolyzed slurry on an ultrafiltration unit with a cut-off value above 10,000, to form a permeate comprising the whey protein hydrolyzate.

2. The method according to claim 1, wherein one of the proteases is derived from *B. licheniformis* and the other protease is derived from *B. subtilis*.

3. The method according to claim 1, wherein the slurry has a protein content of 7–12%.

4. The method according to claim 1, wherein the slurry prior to hydrolysis is pasteurized at a temperature between 70° and 90° C.

5. The method according to claim 1, wherein the pH of the slurry is adjusted using $Ca(OH)_2$ and/or KOH.

6. The method according to claim 1, wherein the slurry is hydrolyzed to a degree of hydrolysis of between 20–30%.

7. The method according to claim 1, wherein the cut-off value of the ultrafiltration unit is above 50,000.

8. The method according to claim 1, wherein the proteases are inactivated by heat treatment after hydrolysis.

9. The method according to claim 1, wherein the proteases are inactivated by acid treatment after hydrolysis.

10. The method according to claim 1, further comprising, after hydrolyzing the slurry and prior to separating the hydrolyzed slurry, treating the hydrolyzed slurry with activated carbon for more than 5 minutes at a temperature of between 50° and 70° C., wherein the activated carbon is present in an amount of between 1 and 5% carbon, calculated in relation to dry matter content, and removing the activated carbon.

11. The method according to claim 1, further comprising, after inactivating the proteases, treating the permeate with activated carbon for more than 5 minutes at a temperature of between 50° and 70° C., wherein the activated carbon is present in an amount of between 1 and 5% carbon, calculated in relation to dry matter content, and removing the activated carbon.

12. The method according to claim 1, further comprising, after inactivating the proteases, concentrating the permeate by nanofiltration at a temperature between 50° and 70° C. to form a retentate comprising the protein hydrolyzate, and/or concentrating the permeate by evaporation.

13. The method according to claim 1, further comprising spray-drying the permeate to a water content below 6.5%.

* * * * *

UNITED STATES PATENT AND TRADEMARK OFFICE
CERTIFICATE OF CORRECTION

PATENT NO.     :     5,691,165

DATED          :     November 25, 1997

INVENTOR(S)    :     Nielsen et al.

It is certified that error appears in the above-identified patent and that said Letters Patent is hereby corrected as shown below:

On the first page of the patent, left column, after Assignee: delete "Novo Nordisk A/S, Bagsvaerd, Denmark" and insert --Danmark Protein A/S, Videbaek, Denmark--.

Signed and Sealed this

Second Day of June, 1998

Attest:

BRUCE LEHMAN

*Attesting Officer*     *Commissioner of Patents and Trademarks*